April 28, 1953  J. F. KOEHLER  2,637,026
CATHODE-RAY TUBE SWEEP CIRCUIT
Filed May 16, 1945  2 SHEETS—SHEET 1
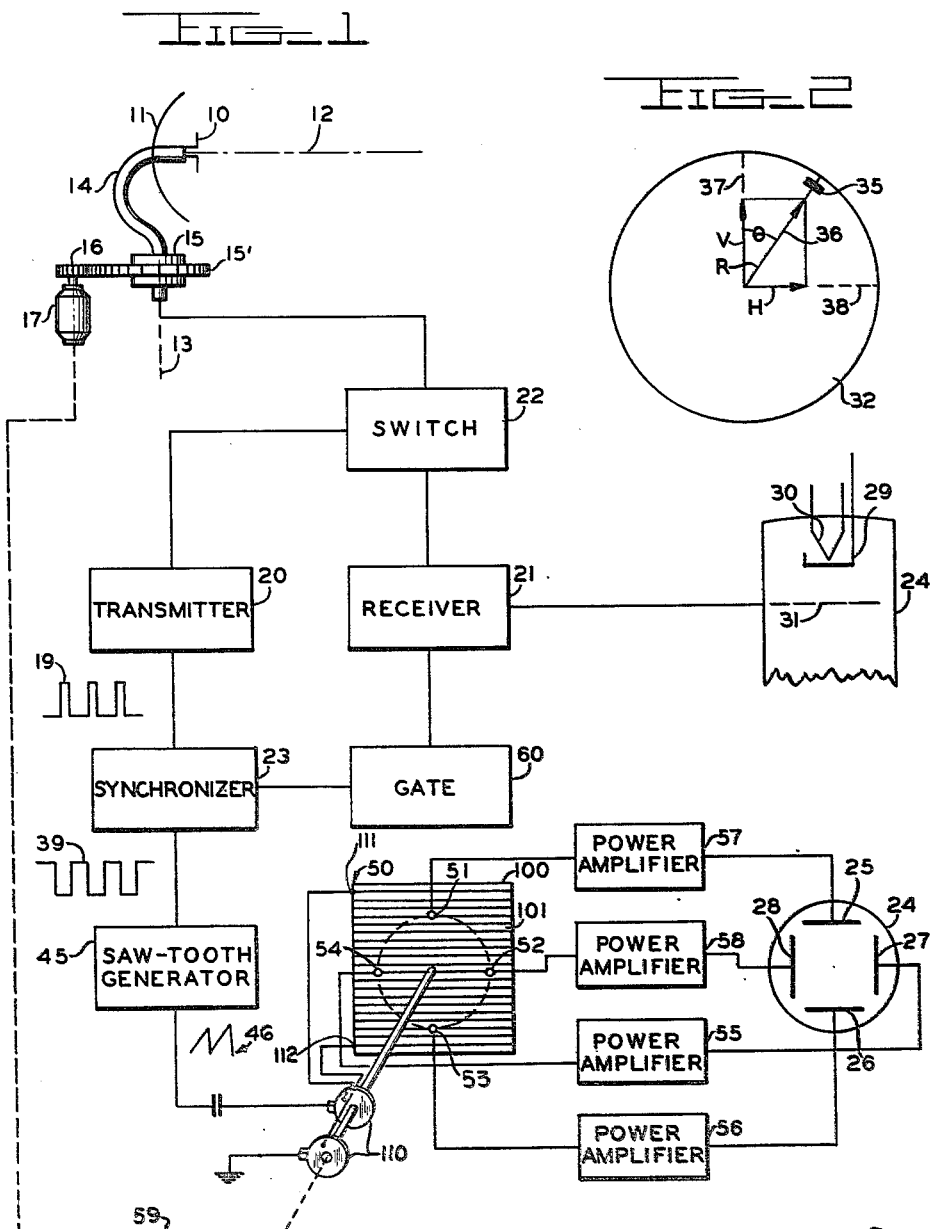
Inventor
JAMES. F. KOEHLER

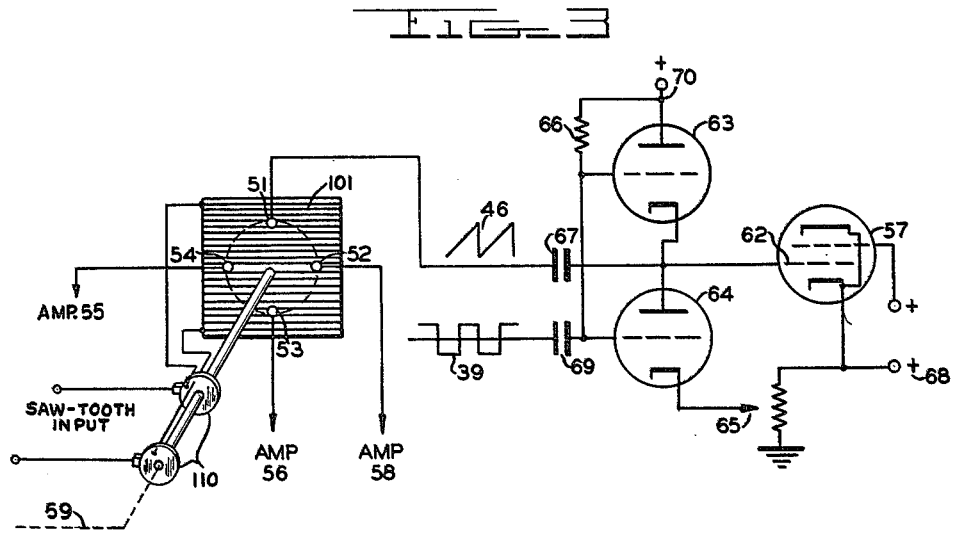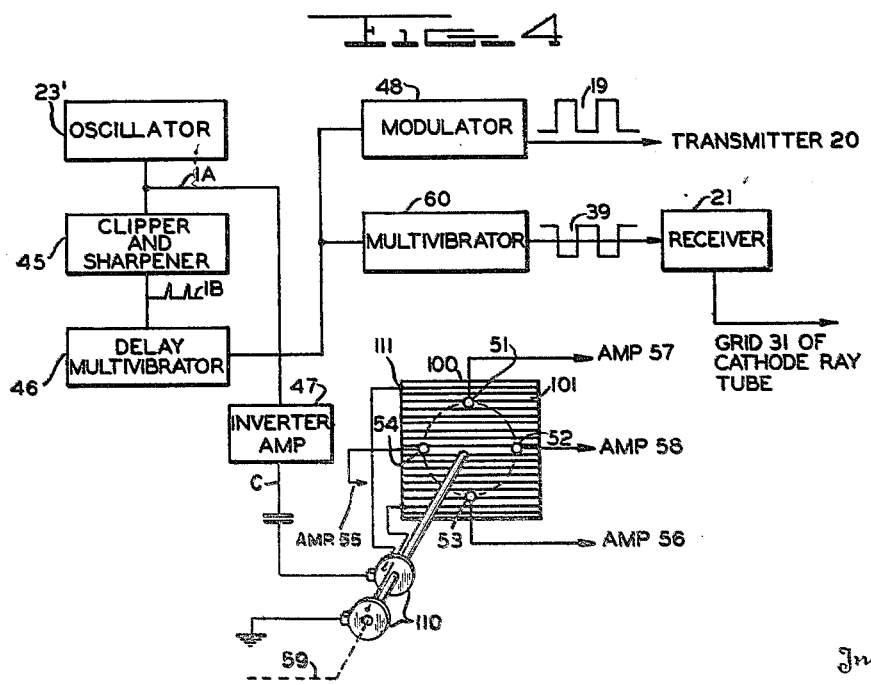

Patented Apr. 28, 1953

2,637,026

UNITED STATES PATENT OFFICE 2,637,026

CATHODE-RAY TUBE SWEEP CIRCUIT

James F. Koehler, Chevy Chase, Md., assignor, by mesne assignments, to the United States of America as represented by the Secretary of the Navy Application May 16, 1945, Serial No. 594,045

8 Claims. (Cl. 343—11)

This invention relates to radio echo detection apparatus, and especially to cathode ray indicators which may be used therewith.

In the art of radio echo detection, electromagnetic radiation, usually at high frequency having waves measured in centimeters, is directed in a relatively narrow beam out into space and this beam is caused to scan a given field. Upon striking an object in space this radiation is reflected back to the source and may be received there. The velocity of such radiation is the same as that of light and is approximately 186,000 miles per second. If, then, the time required for the electromagnetic wave to leave the transmitter, travel to the object in space, and be reflected back again to the transmitter be measured, this time duration will give an accurate indication of the distance between the object and the transmitter. If, at the same time, the direction of the beam when the signal is reflected back is noted, this provides an indication of the direction of the object from the transmitter.

Such a system has been used with a directional antenna, mounted to rotate about a vertical axis, so that the beam of radiation projected from the antenna system may be made to scan an angle of 360° around the axis. The vertical angle of the directional antenna in such a system is adjusted as desired and then not changed when the system is operating, so that the field is scanned in one coordinate.

With such a system a cathode ray tube has been used for the indication, the reflected signal causing a spot of light to appear on the face of the tube. The angle of a radial line through this spot with respect to some reference radial line then may be made to represent the angular direction of the object with respect to a predetermined reference line perpendicular to the rotating axis of the antenna system. The distance the spot of light is from the center of the tube can be made proportional to the range or distance between the object and the transmitter. In the past the deflection of the electron beam in such an indicating tube has been controlled by a magnetic yoke surrounding the neck of the tube and rotated in synchronism with the rotation of the antenna system.

It is an object of the present invention to provide a radio echo detection system of the type referred to above in which the electron beam in the cathode ray indicator tube is deflected by electrical means without the necessity of providing rotating parts on the neck of the cathode ray tube.

Another object of the invention is to provide an apparatus and a method of controlling the electron beam in a cathode ray tube so that the beam will make a sequence of radial sweeps from the center of the tube towards the circumference thereof, each sweep at a slight angle with respect to the one next to it.

Another object of the invention is to provide in a radio echo detection system means to maintain the angle of the sweep in the cathode ray tube, referred to in the paragraph above, in synchronism with the angle of the beam of radiation directed from the antenna.

A more specific object of the invention is to provide a system and a method for controlling the electron beam of a cathode ray tube in the manner described above either by means of magnetic or electrostatic deflection.

A still further specific object of the invention is to provide various circuits for producing the effects found necessary or desirable in order to obtain the desired deflection of the electron beam.

Other objects of the invention and objects relating particularly to the manner of connecting and operating the various parts of the apparatus will be apparent as the description of the invention proceeds.

Several embodiments of the invention have been illustrated in the accompanying drawings, in which:

Figure 1 is a schematic representation of a complete system for carrying out the invention using electrostatic deflection on the cathode ray tube;

Figure 2 is a front view of a cathode ray tube showing the manner in which the indication appears and representing the forces acting on the electron beam;

Figure 3 is a circuit diagram showing in greater detail one manner of producing a radial deflection of the electron beam of a cathode ray tube and including a reference voltage clamping circuit;

Figure 4 is a circuit diagram of a modified arrangement for producing a radial sweep of the cathode ray tube electron beam.

Referring now more particularly to Figure 1 of the drawings, a radiator 10 for electromagnetic waves, as, for instance, a dipole, is shown mounted in a suitable reflector 11, such as a paraboloid, in such a position as to direct a beam 12 of electromagnetic radiation having an axis indicated by the dot and dash line. The radiator 10 and reflector 11 are mounted to rotate about an axis 13 which may be substantially vertical. For this purpose a coaxial line 14 which delivers energy to the radiator 10 is shown curved, so as to be aligned with the axis 13 at a suitable rotating joint 15 through which it passes, for permitting rotation of the radiator 10 and reflector 11 without disturbing the connection. The reflector 11 is shown supported upon the coaxial line, although, of course, any means of supporting the reflector to permit rotation about the axis may be used. The rotation of the radiator 10 and reflector 11, which constitute the antenna system, may be accomplished by means of meshing gears 15' and 16, the former being secured to the coaxial line 14 and the latter to the shaft of a driving motor 17.

Any other means of mounting the radiator and reflector so as to cause the beam 12 to scan substantially a 360° angle about the axis 13 may be used, as well as any other type of directional antenna system, it being understood that the arrangement shown in the figure is merely illustrative and not intended to limit the invention to any particular form of apparatus.

The radiator 10 is connected either to a transmitter 20 or to a receiver 21 by means of a switch device 22 which connects the transmitter to the radiator 10 and effectively disconnects the receiver when the transmitter is operating, but connects the receiver to the antenna 10 and effectively disconnects the transmitter when the transmitter is not operating. Such a switch has been shown and described in the application of James L. Lawson, entitled "Protection of Receiver Against Overload," Serial Number 479,662, filed March 18, 1943. But separate antennas may be used, if desired, for the transmitter and receiver, although when separate antennas are used, care should be taken to mount them so as to get a minimum of interference in the receiver antenna when the transmitter is operating.

The transmitter 20 is arranged to produce a high frequency oscillation, such as one usually measured in centimeters. This oscillation is then transmitted in short pulses at a predetermined recurrence rate, so that the transmitter is not on continuously, but is operating during the period of a pulse only, and is off in the interval between pulses.

The rate and time duration of the pulses is determined by a synchronizer or pulser 23, which is connected to the transmitter and produces an accurately timed sequence of pulses, indicated at 19, which cause the transmitter to operate for the time duration of each pulse. There are a large number of these pulses for each complete 360° scan of the electromagnetic beam.

The synchronizer 23 is also used to control the deflection of the electron beam in a cathode ray tube 24, portions of which are indicated diagrammatically in cross section at the right of Figure 1. An electrostatic deflection tube is represented, the neck being shown in transverse cross section disclosing the vertical deflecting plates 25 and 26 and the horizontal deflecting plates 27 and 28. These are positioned in a known manner in the neck of the tube the end of which is represented in longitudinal cross section to show the cathode 29, the heating element 30, and the control grid 31. The latter is connected to the output of the receiver 21, which is arranged so that received signals will swing the potential of the grid 31 in the positive direction to increase the intensity of the electron beam.

In the system of the invention, it is desired to control the electron beam of the cathode ray tube 24 in such a manner that every time a pulse of the high-frequency oscillation produces electromagnetic radiation from the antenna system 10—11, the electron beam of the cathode ray tube will start from the center and move outwardly at a predetermined rate towards the circumference of the tube, following a radial line, and it is desired that this radial line shall correspond in direction to the direction in which the antenna system 10—11 is pointing. Then, when a reflected signal is picked up by the receiver 21 to swing the potential of the grid 31 of the cathode ray tube positively, a spot of light will be formed on the fluorescent screen 32 of the tube along this radial line, as, for instance, the spot 35. The spot 35 on the radial line 36 in Fig. 2, will have a distance from the center of the tube corresponding to the time required for the pulse to move out from the antenna system 10—11, reach the object in space, and be reflected back again to the antenna system, or, in other words, this distance will correspond to the range of the object. At the same time the angle $\theta$ between the radial line 36 and another radial line, as, for instance, the vertical line 37, will represent the angle through which the radiated beam has been shifted from a given direction at the instant the reflected signal is received.

Movement of the electron beam of the cathode ray tube along these radial lines may be accomplished by providing two forces acting on the beam at right angles to each other. A vector diagram of such forces is indicated in Fig. 2. If the solid line H represents the vector of the force tending to move the beam horizontally to the right and the solid line V represents the vector of the force tending to move the electron beam in a vertical direction towards the top of the tube, then the solid line R will represent the vector resultant of forces H and V. It will be understood that, regardless of the angle $\theta$, these vectors will always maintain the relation: $V^2+H^2=R^2$. Also, it will be evident that if the force R is to be maintained constant as the angle $\theta$ changes, then H must always equal $R$ sine $\theta$ and V must always equal $R$ cosine $\theta$. Therefore, by varying the forces H and V, respectively, with the sine and cosine functions of the angle through which the radiated electromagnetic beam moves, the radial sweep of the beam can be made to correspond to this angle.

Where an electrostatic cathode ray tube is used, as is shown in Fig. 1, it is necessary to provide voltages on the deflecting plates of the cathode ray tube, which vary in a predetermined manner each time a pulse is transmitted from the antenna system. These voltages are preferably substantially linear saw-tooth voltages.

Now, as the antenna system 10—11 rotates, the amplitude of the voltages applied to the two pairs of deflecting plates is changed in proportion to the movement of the antenna 10 and equal to $R$ cos $\theta$ and $R$ sin $\theta$ respectively. If we assume that the antenna 10 is pointing straight ahead in Fig. 1 and that the direction we want the electron beam to move on is the vertical radial line 37 towards the upper edge of the cathode ray tube, then, at this point, when a pulse leaves the antenna 10, the saw-tooth voltages applied to the deflecting plates 25 and 26 will have a maximum difference in value, that of the plate 25 being maximum positive and that of the plate 26 being zero, while the voltages applied to the deflecting plates 27 and 28 will have a minimum difference, or, in other words, will be at the same potential.

This will cause the electron beam to move from the center towards the circumference of the tube on the radial line 37.

But now, as the antenna moves in a clockwise direction to scan the horizon, the amplitude difference of these successive saw-tooth voltage waves which are applied to the deflecting plates 25 and 26 is caused to decrease while the amplitude difference between those applied to the plates 27 and 28 is caused to increase. When 90° angle is reached the voltages on the deflecting plates 27 and 28 will have reached their maximum potential difference. with the plate 27 receiving the maximum positive voltage and the plate 28 receiving zero voltage, while the deflecting plates 25 and 26 will have zero difference in voltage between them. This will cause the electron beam to follow the horizontal line 38 and move towards the right from the center out toward the circumference of the tube.

Upon further rotation of the antenna 10, the difference in potential of the voltage waves on the deflecting plates 27 and 28 is caused to decrease and the difference in potential of the voltage waves on the plates 25 and 26 to increase with the voltages applied in the opposite sense. Thus, when the antenna 10 is pointing in the opposite direction from that shown in Fig. 1, a maximum positive saw-tooth wave will be applied to the deflecting plate 26, while a zero voltage wave will be applied to the plate 25. At the same time there will be no voltage difference between the deflecting plates 27 and 28, and the electron beam will move from the center down towards the lower edge of the face of the tube. If the amplitudes of these saw-tooth voltages applied to the plates are thus varied proportionately, those of the vertical plates increasing or decreasing with the cosine of the angle as the voltages on the other plates are decreasing or increasing with the sine of the angle, the electron beam may be made to trace radial lines around the face of the tube, the angular movement of the trace being synchronized with the movement of the antenna.

One manner of producing these saw-tooth waves and applying them to the plates of the cathode ray tube is illustrated in Fig. 1. In this arrangement the synchronizer 23 not only produces the transmitter keying pulses 19, but is also designed to synchronously produce the negative rectangular pulses 39 at the same recurrence rate as pulses 19, but of a time duration, which is arbitrarily chosen to correspond to the range of the system. These negative rectangular pulses 39 are then applied to the saw-tooth generator 45, which produces in a known manner a saw-tooth voltage wave somewhat as indicated at 46, which voltage wave is thereafter impressed across a sinusoidal potentiometer 50.

Complete details of the sinusoidal potentiometer 50 are disclosed in the patent application of Paul Rosenberg, Serial No. 592,795, filed May 9, 1945, for Sine Wave Potentiometer now U. S. Patent 2,549,389, issued April 17, 1951.

To avoid confusion in Fig. 1 the sinusoidal potentiometer 50 has been there shown in a greatly simplified manner. In its preferred form, the sinusoidal potentiometer consists of a thin square card 100 of insulating material upon which a fine enameled resistance wire 101 is wound in such a way as to form closely adjacent parallel turns. By using enameled wire the adjacent turns do not electrically connect with each other although they may be in physical contact. After the card is completely wound with wire, the enamel is buffed off on one side in a circular path as shown by the dotted circle, to permit the voltage output brushes 51, 52, 53, and 54 to contact with the wire.

The first pair of brushes 51 and 53 are positioned at diametrically opposite points on a first axis which passes through the midpoint of the card at right angles to the first axis. Thus, as the card is rotated relatively to the brushes in accordance with the movement of the antenna system 10—11 the voltage between one pair of brushes varies co-sinusoidally for any given voltage placed across the terminals of the resistance wire 101. Although I have indicated the use of a preferred type of sine wave potentiometer any other suitable type of potentiometer may be used if desired.

For purposes of illustration the connection between the antenna and the sine wave potentiometer has been indicated by the dotted line 59, and it will be understood that this may be a direct mechanical connection or a connection through synchronous motors to cause the rotation of the card 100 to follow the movement of the antenna as the latter scans about the axis 13. The output from brushes 51 and 53 are connected to the vertical deflecting plates through amplifiers 56 and 57, while the output from brushes 52 and 54 are connected to the deflecting plates 27 and 28, through the amplifiers 55 and 58. It will be understood that other forms of sine wave producing devices may be employed if desired.

Thus from the foregoing it will be observed that when the card 100 is in the position shown in Fig. 1, the vertical deflecting plates 25 and 26 are receiving saw-tooth waves of maximum difference in potential and the horizontal deflecting plates 27 and 28 are receiving equal potential saw-tooth waves since the amount of resistance wire 100 between brushes 51 and 53 is maximum and the amount of resistance wire 101 between brushes 52 and 54 is minimum. In this case the electron beam will move vertically up to the top of the tube or to the bottom depending on which of the vertical deflecting plates receive the maximum positive saw-tooth wave as the card is rotated, however, the amplitude of the horizontal deflecting plate voltage will increase in proportion to the sine of the angle of rotation while the vertical deflecting plate voltage will decrease in proportion to the cosine of the angle of rotation until the card 100 has rotated 90° at which time the difference in horizontal deflecting plate voltage will be maximum.

If desired, a gate circuit 60 may be provided which is controlled from the square wave 39 of the synchronizer 23 and may deliver a gate pulse to the receiver 21 or to the cathode ray tube which will prevent any response of the receiver from affecting the cathode ray tube except at periods determined by the time duration of the pulses 39.

The operation of this system will be understood from the description already given. A pulse sent out from the antenna 10 will travel out into space in the direction in which the antenna system is pointing and if it strikes an object in space will be reflected back, being picked up by the antenna in the interval between pulses, the pulses being spaced sufficiently in time duration to permit the reception of the reflected pulse before the next pulse is sent out. At the same time that the pulse is sent out from the antenna, a saw-tooth voltage is started by the saw-tooth generator 45, which is under the control of the synchronizer 23, and this saw-tooth wave is applied across the sinusoidal potentiometer at contact points 111 and 112 through a pair of slip rings 110 mounted on the axis of rotation of the potentiometer card to permit rotation of the card relative to the brushes. The voltage difference across brushes 51 and 53 and across 52 and 54 will then be determined by the position of the potentiometer card 100, which is in turn determined by the position of the antenna 10. Hence the electron beam will move on a radial line which is determined by the position of the antenna. When the signal is received back by reflection from the object in space, it will intensify the electron beam, with the result that a spot of light will appear on that particular radial line at a distance from the center corresponding to the range of the object. By means of the gate circuit 60 the response of the receiver may be made effective during the time periods of the saw-tooth pulses only, so that signals received at any other time will not appear on the face of the cathode ray tube. In such a case, what happens to the electron beam between the saw-tooth pulses is unimportant.

In using the foregoing type of indication, it is desired to have the electron beam start from the center of the tube for each sweep that it makes. In order to do this it is necessary to apply in some manner a direct current reference potential which will positively locate the electron beam at the center of the tube when the sweep begins. One simple manner of applying such a reference voltage has been indicated in Fig. 3, this reference voltage being applied to the grid 62 of the power tube 57. This arrangement consists of two triode tubes 63 and 64, the cathode of the former and the plate of the latter being connected to the grid 62. The plate of the tube 63 is then given a positive potential of low voltage, as indicated at 70, and the cathode of the tube 64 is given the reference potential at which it is desired to start each saw-tooth wave. This reference potential may be obtained by connecting the cathode of the tube 64 to the arm of a potentiometer 65, the resistance of which is connected between ground and the cathode of the tube 57 the latter cathode being given a low positive bias potential. The grids of the two tubes 63 and 64 are connected together and to the source of potential 70 through a resistance 66. These grids are then supplied through a condenser 69 with the negative square pulses 39 from the synchronizer, this connection having been omitted in Fig. 1 to avoid confusion.

Because of the positive potential on the grids of the tubes 63 and 64, these tubes will normally be capable of conducting and either will conduct whenever a suitable potential difference appears between its plate and cathode. Since the grid of the tube 64 will begin to draw current whenever its potential rises to the potential of the bias source obtained from potentiometer 65, it will never greatly exceed this potential, and hence the grids of both tubes 63 and 64 are normally held at the bias potential. If this is so, it makes no difference whether the grid 62 of the tube 57 is positive or negative with respect to the bias potential; if it is negative, there will be plate-cathode current in the tube 63, and if it is positive, there will be plate-cathode current in the tube 64, and, in either case, the result will be that the grid 62 will be brought very nearly to the potential of the bias source 68.

This function of the tubes 63 and 64 will take place in the interval between the saw-tooth pulses. However, it will be seen that the negative square pulse or gate 39 begins as the saw-tooth voltage starts to rise, in the case of a positive saw-tooth wave, or fall in the case of a negative saw-tooth wave, and this negative square pulse swings the voltage on the grids of the tubes 63 and 64 to a value below cutoff, so that these tubes cease conducting as the saw-tooth voltage starts to rise or fall. The potential of the grid 62 of the tube 57 is therefore free to rise or fall in accordance with either a positive or negative saw-tooth applied to it until the trailing edge of the saw-tooth is reached, at which time the trailing edge of the negative pulse is also reached permitting the potentials of the grids of the tubes 63 and 64 to swing positively again to start one or the other of the tubes conducting and bring the grid 62 of the tube 57, back to the reference potential of the source 68.

In this clamping circuit the time constant of the resistance 66 and the condenser 69 should be greater than the recurrence time of the saw-tooth, in order to maintain the grids of the clamping tubes negative during the time that the clamping effect is not desired. However, it should be noted that, since, in the present use of the clamping circuit, it is necessary to clamp the voltage just before the start of the saw-tooth, only the trailing edge of the negative square pulse applied to the grids of the clamping tubes may occur at any time after the trailing edge of the saw-tooth, as long as the leading edge occurs at the start of the saw-tooth. The resistance 66 should be sufficiently high so that the grid currents of the tubes 63 and 64 will not be large enough to harm the tubes. It will be noted that the potential through the resistance 66 helps pull the potentials of the grids of the tubes 63 and 64 up to the desired reference potential at which time the grid current in the tube 64 stops the further rise in potential. While large currents flow through all of the elements of the two tubes, the square pulse, which controls the operation of the circuit like a gate need deliver very little current. The circuit responds to the voltage change of this square pulse.

It will be understod that there are four power amplifier tubes, 55, 56, 57, and 58, each with a pair of clamping triodes for providing the voltages on the four deflecting plates of the cathode ray tube 24.

In Fig. 4 another manner of producing a rotating radial sweep is shown. Here an oscillator 23' is provided, which may be of the Wein bridge type, adjusted to operate, say, at 2,000 cycles per second and produce a sine wave output which is applied in parallel to a clipper sharpener amplifier 45 and to an inverting amplifier 47. The latter, which may be a simple beam power tube, applies a sine wave voltage through slip rings 110 across the resistance wire 101 of the sine wave potentiometer, which is of a phase opposite to that derived from the oscillator 23', as shown at C. The clipper and sharpener amplifier 45 clips the very positive peaks of the positive outputs from the oscillator 23' and amplifies these peaks sufficiently to produce a sharp positive keying pulse as indicated at 1B. These positive peaks actuate the delay multivibrator 46 which produces a negative voltage pulse of a time duration such that its trailing edges just coincide with the start of the linearly rising portion of the sine wave voltage applied to the sine wave potentiometer 100. This negative voltage pulse is differentiated by means not shown so that its leading and trailing edges produce negative and positive voltage "pips" which are fed in parallel to the multivibrator 60 and modulator 48, both of which respond to the positive differentiated "pips." The modulator 48 operates in a known manner to produce the positive keying pulses 19 for the transmitter 20, while the multivibrator 60 operates to produce the negative unblanking pulses 39 which are of a time duration equal to the linear rising portion of the sine wave voltage applied to the sine wave potentiometer 100 and are applied to the receiver 21 to unblock the latter and thereby render visible only that movement of the cathode ray tube beam that is caused by the rising linear portion of the sine wave voltage applied to the potentiometer 101.

Like Fig. 1, the arrangement shown in Fig. 4 may contain a voltage clamping circuit similar to that shown in Fig. 3 interposed between each brush 51, 52, 53, and 54 and the amplifier 55, 56, 57 and 58 to which it is connected. In this case, however, the unblanking pulses 39, obtained from the multivibrator 60 not only operate to render visible only a limited portion of the cathode ray tube beam movement by unblocking the receiver 21, but also operate to block the clamping tubes in such a manner as to preclude any movement of the beam except that which occurs during these pulses. As in the case of Fig. 1 the connection from the multivibrator to the grids of the clamping tubes has been omitted to avoid confusion. Alternatively, the clamping circuit of Fig. 1 may be omitted, because of the symmetry of the sine waves from the potentiometer 100, and amplifiers alone may feed the sine waves to the cathode ray tube.

It will be understood from the description of the various figures and the disclosure therein that I have provided the means to control the deflection of a cathode ray tube so as to cause the electron beam to sweep from a predetermined point on the face of the tube toward the circumference thereof every time a pulse of the high frequency oscillation is radiated from the antenna, and I have also provided the means to cause that sweep to rotate about this predetermined point on the face of the tube in synchronism with the rotation of the radiating antenna. By means of the invention either electrostatic or electromagnetic deflection may be used and various ways of producing the sweep circuits have been shown and described.

Various modifications of the invention besides those shown and described may be used without departing from the spirit thereof, and I do not, therefore, desire to limit my invention except as it is limited by the appended claims.

What I desire to claim and secure by Letters Patent is:

1. A system for producing a substantially straight line sweep of the electron beam in a cathode ray tube and causing said sweep to rotate about a predetermined point on the face of said tube, which comprises, in combination, means adapted to produce a first field of force within said tube, operating to move the electron beam of said tube in a predetermined direction, means adapted to be connected to said tube to create a second field of force within said tube, operating to move the electron beam of said tube in a direction substantially at right angles to said first direction, a rotatable sinusoidal potentiometer adapted to be rotated at a much slower rate than said fields of force and means connecting said potentiometer to said field of force generating means thereby to vary one of said fields of force sinusoidally and the other co-sinusoidally so as to produce rotation of the resultant of said fields of force.

2. A system for producing the sweep of the electron beam of a cathode ray tube along a predetermined substantially straight line and to rotate said sweep about a predetermined point on the face of said tube, which comprises, in combination, a means to produce a saw-tooth wave, a sinusoidal potentiometer having an insulating card on which closely adjacent turns of resistance wire is wound, and two pairs of quadraturely spaced brushes arranged to contact said resistance wire, means to apply the output of said saw-tooth generator across the resistance wire of said sinusoidal potentiometer, means connected to said cathode ray tube to utilize the output from one pair of brushes of said sinusoidal potentiometer so as to move the electron beam of said tube in a first direction, a second means connected to said cathode ray tube to utilize the output from the other pair of brushes of said sinusoidal potentiometer so as to move the electron beam of said tube in direction substantially perpendicular to said first direction, and means for rotating the card on which the resistance wire of said potentiometer is wound relative to said brushes so as to vary the amplitude of the output from said one and said other pair of brushes, sinusoidally and co-sinusoidally respectively.

3. A system for producing the sweep of the electron beam of a cathode ray tube along a predetermined substantially straight line and to rotate said sweep about a predetermined point on the face of said tube, which comprises, in combination, a means to produce a saw-tooth wave, a sinusoidal potentiometer having an insulating card on which closely adjacent turns of resistance wire are wound, and two pairs of brushes spaced 90° apart and arranged to contact said resistance wire, means for applying the output of said saw-tooth generator across said resistance wire, a first pair of amplifiers connected to couple the output from one pair of said brushes to the vertical deflecting plates of said cathode ray tube, a second pair of amplifiers connected to couple the output of the other pair of said brushes to the horizontal deflecting plates of said cathode ray tube, and means for rotating the card on which the resistance wire of said potentiometer is wound relative to said brushes so as to vary the amplitude of the output for said one and said other pair of brushes sinusoidally and co-sinusoidally respectively.

4. In a system for producing the sweep of the electron beam of a cathode ray tube along a predetermined substantially straight line and rotating said sweep about a predetermined point on the face of said tube by means of a pair of saw-tooth voltage waves acting on the respective beam deflecting means of said tube; a sinusoidal potentiometer, comprising an insulating card which is adapted to be rotated about an axis perpendicular to its principal faces and on which closely adjacent turns of resistance wire is wound, two pairs of brushes arranged to contact said resistance wire such that the brushes of each pair lie opposite to each other with the axes of rotation mid-way between them and such that the plane which contains one pair of brushes is disposed at right angles to the plane of the other brushes, a source of saw-tooth voltage waves, means interposing said potentiometer between said tube and said source of saw-tooth voltage waves, and means rotating said card on which said resistance wire is wound relative to said brushes so as to vary the saw-tooth voltage wave appearing across one of said pairs of brushes sinusoidally and the saw-tooth voltage appearing across the other of said pair of brushes co-sinusoidally.

5. A system for producing the sweep of the electron beam of a cathode ray tube along a predetermined substantially straight line and rotating said sweep about a predetermined point on the face of said tube, which comprises in combination, a source of sine wave voltage, a rotatable sine wave potentiometer from which two output voltages may be derived, one of which varies sinusoidally with the rotation of said potentiometer and the other of which varies co-sinusoidally, means applying said sine wave voltage to said potentiometer, means for coupling one output from said potentiometer to said cathode ray tube so as to move the electron beam thereof in one direction, means to connect the other output of said potentiometer to the cathode ray tube to produce movement of the said beam in a direction substantially at right angles to said first direction, timing means synchronized with said sine wave voltage and coupled to said tube for rendering said beam visible only during the application of the linear rising portion of said sine wave voltage to said potentiometer, and means for rotating said potentiometer at a much slower rate than the frequency of said sine wave voltage applied thereto.

6. In a radio echo detection system having a transmitter, a receiver, a cathode ray tube indicator and a rotatable antenna system which is adapted to scan a 360° expanse about its axis of rotation, a means for producing a rotating radial sweep which moves with the rotation of said antenna system which comprises in combination, a means for producing a sine wave voltage, means for keying said transmitter in response to the positive peaks of said sine wave voltage, a rotatable sine wave potentiometer from which two output voltages may be obtained, one of which varies sinusoidally with the rotation of said potentiometer and the other of which varies co-sinusoidally, means applying said sine wave voltage to said potentiometer, means coupling one output from said potentiometer to said cathode ray tube so as to move the electron beam thereof in one direction, means coupling the other output of said potentiometer to the cathode ray tube to produce movement of the said beam in a direction substantially at right angles to said first direction, timing means for rendering said beam visible only during the application of the linear rising portion of said sine wave voltage to said potentiometer and means for rotating said potentiometer at a much slower rate than the frequency of said sine wave voltage applied thereto.

7. A radial sweep circuit for a cathode ray tube having orthogonally disposed deflection means comprising, a rotating sinusoidal potentiometer, a sawtooth voltage generator, means for applying the output of said generator across said potentiometer, means for deriving from said potentiometer two sawtooth voltage waves, one of said waves being characterized by a sinusoidal variation in amplitude and the other thereof by a co-sinusoidal variation in amplitude, and means for applying said waves to said orthogonally disposed deflection means.

8. A radial sweep circuit for a cathode ray tube having orthogonally disposed deflection means comprising, a generator of a sawtooth voltage of substantially constant amplitude, a sinusoidal potentiometer having an insulating card on which closely adjacent turns of resistance wire is wound and two pairs of brushes arranged to contact said resistance wire, means for applying said sawtooth voltage across said potentiometer, means for deriving from said brushes two pairs of sawtooth voltage waves, one pair of said waves being characterized by a sinusoidal variation in amplitude and the other pair by a co-sinusoidal variation in amplitude, and means for applying said waves to said orthogonally disposed deflection means.

JAMES F. KOEHLER.

References Cited in the file of this patent

UNITED STATES PATENTS

| Number | Name | Date |
| --- | --- | --- |
| 2,151,917 | Hyland | Mar. 28, 1939 |
| 2,360,466 | Bedford et al. | Oct. 17, 1944 |
| 2,395,966 | Goldberg | Mar. 5, 1946 |
| 2,400,791 | Tolson et al. | May 21, 1946 |
| 2,426,217 | Hoisington | Aug. 26, 1947 |
| 2,444,407 | Shank | June 29, 1948 |
| 2,464,822 | Mallett | Mar. 22, 1949 |

FOREIGN PATENTS

| Number | Country | Date |
| --- | --- | --- |
| 520,778 | Great Britain | Apr. 3, 1939 |
| 542,634 | Great Britain | Jan. 21, 1942 |